INVENTOR.
BERNARD HOWARD

INVENTOR.
BERNARD HOWARD
BY Clark & Ott
ATTORNEYS

Fig. 5.

INVENTOR.
BERNARD HOWARD
BY
Clark & Ott
ATTORNEYS

Oct. 7, 1952 — B. HOWARD — 2,613,321
PRESELECTOR TUNING MECHANISM
Filed Sept. 6, 1951 — 9 Sheets-Sheet 6

INVENTOR
BERNARD HOWARD
BY
Clark & Ott
ATTORNEYS

Oct. 7, 1952          B. HOWARD          2,613,321

PRESELECTOR TUNING MECHANISM

Filed Sept. 6, 1951          9 Sheets-Sheet 8

INVENTOR.
BERNARD HOWARD
BY
Clark & Ott
ATTORNEYS

Patented Oct. 7, 1952

2,613,321

UNITED STATES PATENT OFFICE 2,613,321

PRESELECTOR TUNING MECHANISM

Bernard Howard, Ramsay, N. J., assignor to Air Associates, Incorporated, Teterboro, N. J., a corporation of New Jersey Application September 6, 1951, Serial No. 245,349

6 Claims. (Cl. 250—40)

This invention relates to a preselector mechanism for pretuning a radio receiver, transmitter and the like to a desired frequency.

The invention has in view to provide a preselector mechanism having two driven shafts on which are mounted means for pretuning a radio receiver, transmitter and the like to any one of a plurality of frequencies by the automatic setting of said shafts in accordance with the manual setting of a manual control shaft.

Another object of the invention is to provide a preselector tuning mechanism of said character in which one of the said driven shafts is arranged for controlling a plurality of circuits each representing a different frequency range and the other of said shafts is a shaft for controlling the position of tunable capacitors in the circuits of a radio receiver, transmitter and the like. The said shafts are adapted to be preset to any one of a plurality of different frequency positions in accordance with the selected presetting of a plurality of preset switches each having a plurality of contacts adapted to be interposed in the circuits providing the different frequency ranges by the presetting of the manual control shaft. After the same has been preset, the preselector mechanism may thereafter be adjusted to any one of the preset positions for automatically obtaining the desired frequency range.

Another object of the invention is to provide means for automatically closing the circuit with the motor for rotating the driven shafts with the setting of the manual control shaft and for interrupting the circuit with the motor when the shafts have been moved to set positions.

With the foregoing and other objects in view, reference is now made to the following specification and accompanying drawings in which the preferred embodiment of the invention is illustrated.

Referring to the drawings by characters of reference, the preselector mechanism is illustrated in its application to the automatic setting of two tuning shafts 10 and 11 of a radio receiver, transmitter and the like. The tuning shaft 10 is a turret shaft for controlling a plurality of circuits each representing a different frequency range, and the tuning shaft 11 is a condenser shaft for controlling the position of a plurality of condensers arranged in gang formation. The said shafts are adapted to be preset to provide a plurality of different frequency positions in accordance with the selective presetting of a plurality of preset switches each having a plurality of contacts adapted to be interposed in the circuits providing the different frequency ranges by the presetting of a manual control shaft 12 whereby the mechanism may thereafter be set in any one of said preset positions for automatically obtaining the desired frequency range.

The turret shaft 10 is journaled for rotation in bearings 13 and 14 in the front and rear walls 15 and 16 of a casing 17 and is rotated in step by step movement by means of a Geneva wheel 18 affixed to the forward end thereof between the front wall 15 and the auxiliary wall 19 of the casing. The Geneva wheel 18 forms part of a Geneva movement which also includes a cam disk 20 having a crank arm 21 provided with a roller 22 which is adapted to engage the slots 23 in the Geneva wheel to provide the step by step motion of the turret shaft. As illustrated, the Geneva wheel is provided with six slots 23 so as to set the turret shaft in any one of six different frequency positions. The cam disk 20 is affixed to a shaft 24 journaled for rotation in a gear box 25 having a driving shaft (not shown), connected with an electric motor 26 for rotating the turret shaft through the Geneva wheel.

The condenser shaft 11 is journaled for rotation in bearings 28 and 29 in the front wall 15 and a front panel 30 and extends through an opening 31 in the auxiliary forward wall 19. The said shaft is rotated by a pitman and rack mechanism with the rotation of the cam disk 20. The said mechanism includes a link 33 pivotally connected with the crank arm 21 on a pivot pin 34 located in substantially right angular relation with the roller 22 and which link is pivoted at its opposite end on a pivot pin 35 to a slide 36 mounted for reciprocatory movement in an elongated slot 37 in a swinging bar 38. The swinging bar 38 is pivoted at its upper end in depending relation on a pivot pin 39 to the front wall 15 and at its opposite end the said bar is pivotally connected on a pivot pin 40 to an angulated bar 41 which extends laterally to the right in Fig. 4 of the drawings and is pivotally connected to a latch bar 42 for a purpose hereinafter described. The slide 36 has reciprocatory movement in the slot 37 with the rotation of the shaft 24 so as to impart swinging motion to the swinging bar 38. The slide 36 is provided with a rectangular projection 43 forming a dog which is adapted to engage in a correspondingly shaped notch or recess 44 in the side edge of a rack 45 of the pitman and rack mechanism. The said rack is mounted for vertical reciprocatory movement on studs 46 and 47 anchored in the front wall 15 of the casing and which studs protrude through aligned longitudinally extending slots 48 and 49 provided in said rack above and below the notch or recess 44 with the protruding ends thereof provided with enlarged heads for retaining the rack in position thereon for movement with the slide 36 when the dog 43 is engaged in the notch or recess 44. The rack 45 is formed with rack teeth 50 on the longitudinal edge thereof opposite the notch or recess 44 and which rack teeth are disposed in engagement with a gear 51 affixed to the condenser shaft 11 for imparting reciprocatory movement thereto.

The condenser shaft 11 is formed with a reduced forward end 55 which is provided with a threaded bore 56 opening into a diametrically disposed cross slot 58 and with oppositely disposed longitudinal key way slots 59 and 60 extending throughout the enlarged portion 61 thereof from the shoulder formed by the reduced forward end 55 to the gear 51. Arranged on the enlarged portion 61 of said shaft is a plurality of centrally apertured detent disks 62 which are of similar formation each having a notch or detent 63 formed in the periphery thereof. The said disks slidably fit the shaft to permit of rotation of the shaft with reference thereto and arranged therebetween are pairs of relatively smaller centrally apertured spacer disks 64 and 65 each formed with a radial slot 66 and with inwardly extending projections 67 and 68 on opposite sides of said radial slot providing keys which snugly engage the longitudinally extending slots 59 and 60 for retaining the said disks in position on the shaft for rotation therewith. The said spacer disks are arranged with one of the disks, such as the disk 64 having its projections 67 and 68 engaging in the slot 59 while the other disk of each pair, such as the disk 65 has its projections 67 and 68 engaging in the slot 60. The said disks are also provided with peripheral projections 69 and 70 located on one side of a medial line for a purpose to be described hereinafter. A pressure screw 71 is threadedly engaged in the bore 56 of said shaft with the inner end of said screw protruding into the cross slot 58 for engagement against a key 72. The key 72 is formed with inclined surfaces 73 which engage against a clamping ring 74 disposed against the outermost spacer disks 64 for frictionally clamping the said disks on the shaft as desired. The condenser control shaft includes a shaft section 78 on which is mounted groups of condenser plates 79 adapted to be moved into position between fixed condenser plates 80 of a plurality of condensers 81 for varying the capacity thereof with the movement of the condenser shaft 11.

In the embodiment illustrated, the detent disks 62 are six in number corresponding to the number of said frequency range positions and the same are arranged on the shaft 11 with the detents 63 thereof disposed in circumferentially spaced relation about the shaft. The detent disks are adapted to be held against rotation with reference to the shaft 11 in accordance with the presetting of a selector drum 82 secured on the manual control shaft 12. For this purpose, six pawls 84 are provided which are mounted for independent rocking movement on a shaft 85 affixed to the forward wall 15 of the casing. The pawls 84 are disposed in parallel alignment with the detent disks respectively and are of similar formation each having a rounded projection 86, a terminal 87 at one end thereof and an arcuate projection 88 at the opposite end which are adapted to engage in arcuately spaced slots 89 in the periphery of the selector drum 82 secured on the manual control shaft 12. The slots 89 are arranged in offset circumferentially spaced relation about the drum in longitudinal alignment with the pawls respectively whereby the control shaft 12 may be manually set to any one of six preselect positions. With the engagement of the arcuate projection 88 of one of the pawls in the slot 89 positioned by the setting of the control shaft 12, the rounded projection 86 of said pawl will engage in the detent 63 of the detent disk 62 disposed in alignment with said pawl to thereby discontinue rotation of the said disk. Leaf springs 91 tension the pawls into engagement against the peripheries of the detent disks respectively and the terminals 87 of the pawls are adapted to be engaged by the latch bar 42 for rocking the pawls to firmly seat the projections 86 in the detents 63 of the detent disks 62.

The latch bar 42 is of inverted U-shaped formation and is affixed to a shaft 100 extending through aligned openings in the legs of said latch bar with the ends of the shaft rotatably mounted in the front wall 15 and auxiliary forward wall 19 to dispose the upwardly extending projection 101 in position to be engaged by any one of the terminals 87 of the pawls 84. The latch bar is also formed with a laterally extending projection 103 which is provided with a lug slidably engaging in a slot 104 in the end of the angulated bar 41 and with the outer end of said projection tensioned by a coil spring 105 secured thereto and to a lug 102 carried by said angulated bar 41 for tensioning the latch bar to maintain the dog 43 in the notch 44. The outer end of the shaft 100 protrudes through the auxiliary forward wall 19 and has a latch arm 106 affixed thereto.

Located between the latch arm 106 and the auxiliary forward wall 18 is a toggle lever 107 which is pivoted to the auxiliary forward wall on a pivot pin 108 for limited rocking movement. The said toggle lever is formed with an opening 109 through which freely protrudes the shaft 100 to permit of rocking movement thereof. The latch arm 106 and the toggle lever 107 are formed with upstanding studs 110 and 111 to which are affixed the opposite ends of a coil spring 112 for tensioning the latch arm to snap to position on opposite sides of a longitudinal center line of the toggle lever.

Figure 4:
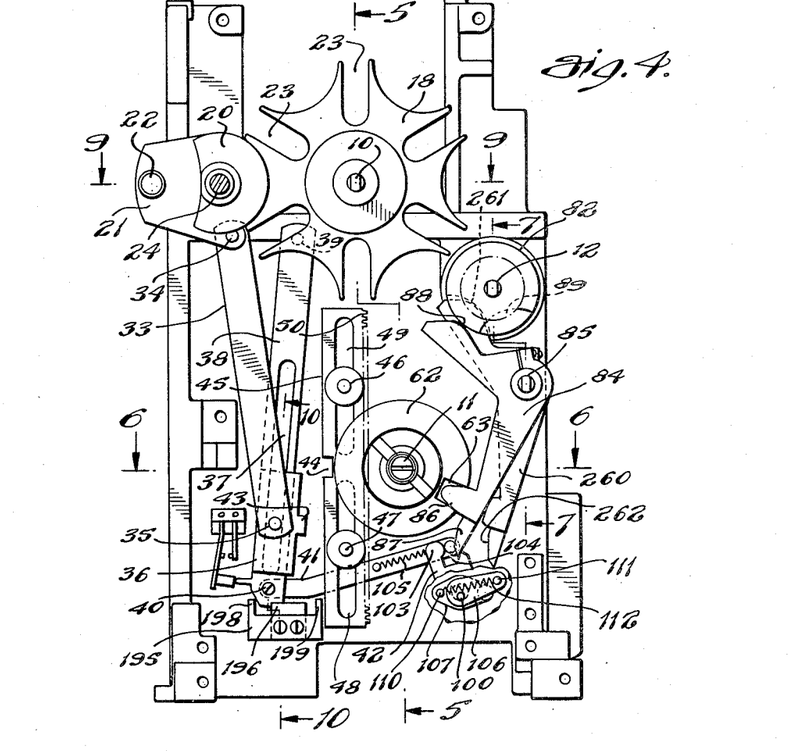
Fig. 4 is a front view with the front panel and the auxiliary forward wall removed.
Figure 5:
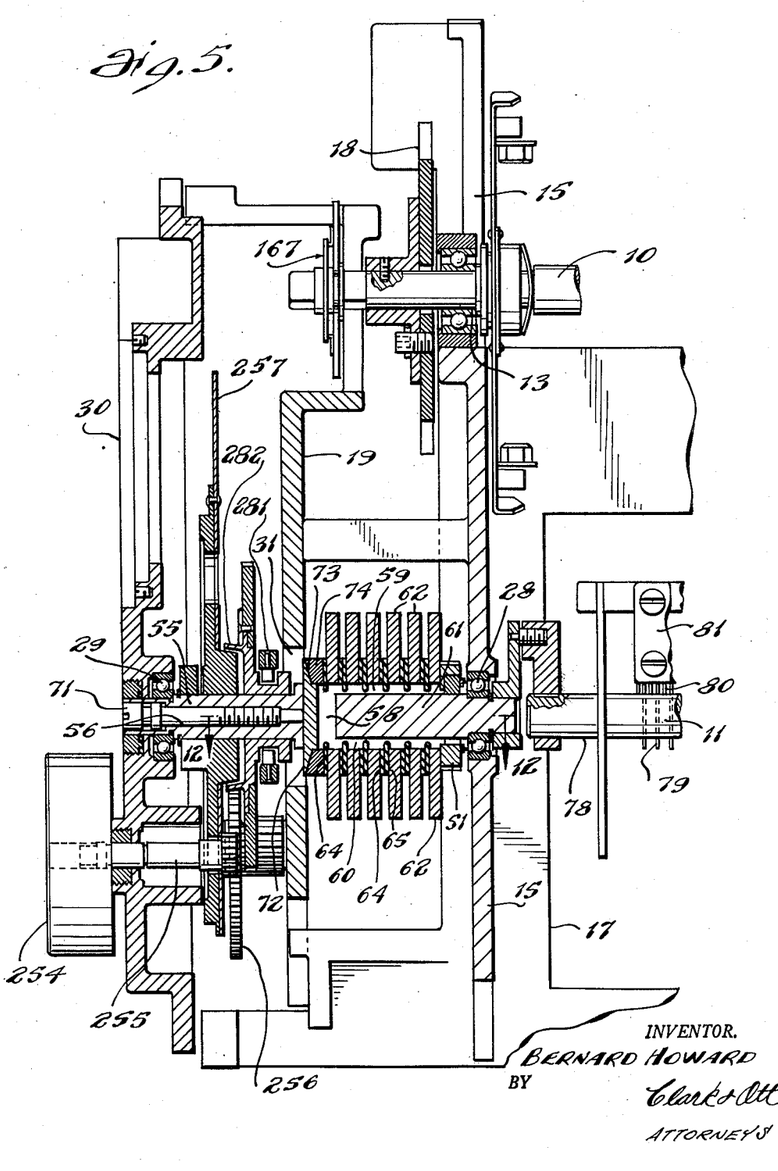
Fig. 5 is a fragmentary sectional view taken approximately on line 5—5 of Fig. 4.
Figure 6:
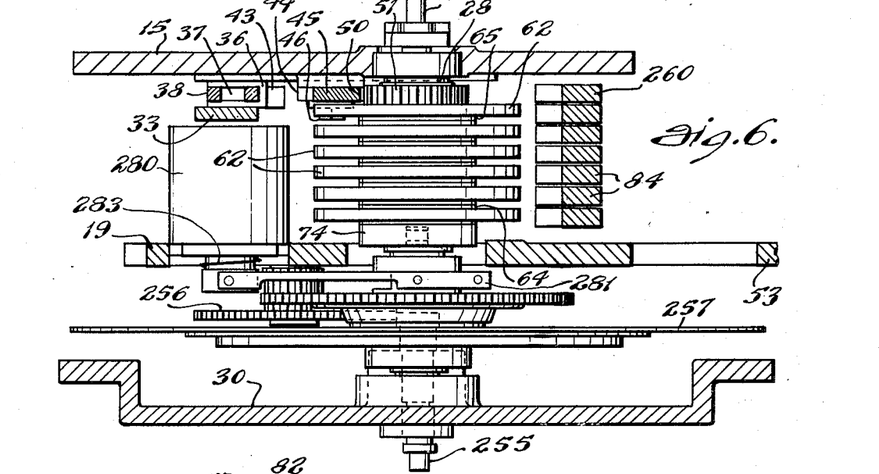
Fig. 6 is a fragmentary sectional view taken approximately on line 6—6 of Fig. 4.
Figures 7, 8, 11:
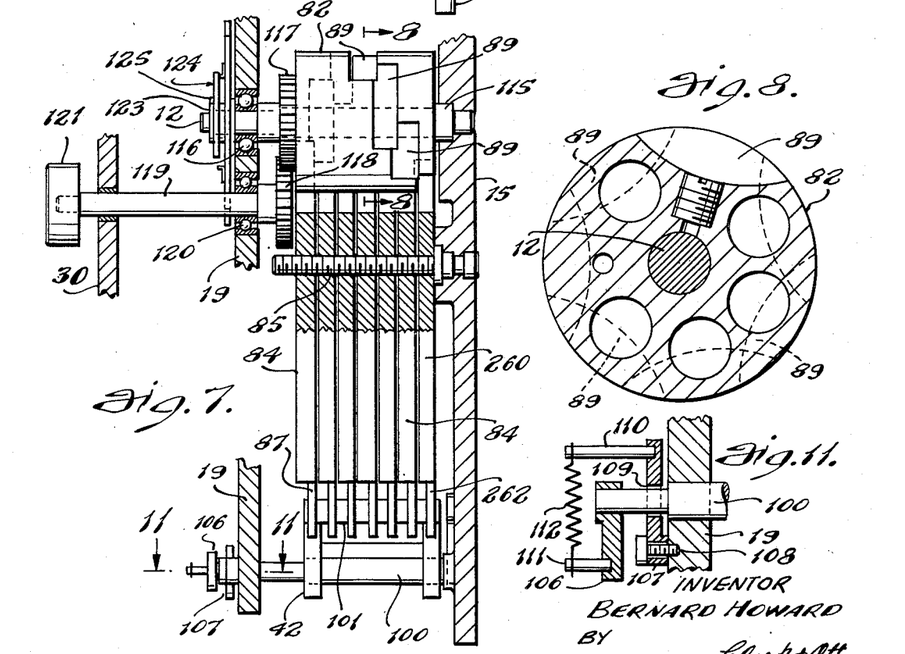
Fig. 7 is a sectional view taken approximately on line 7—7 of Fig. 4.
Fig. 8 is a section through the manual control shaft and drum taken approximately on line 8—8 of Fig. 7.
Fig. 11 is a fragmentary sectional view taken approximately on line 11—11 of Fig. 7.
Figure 9:
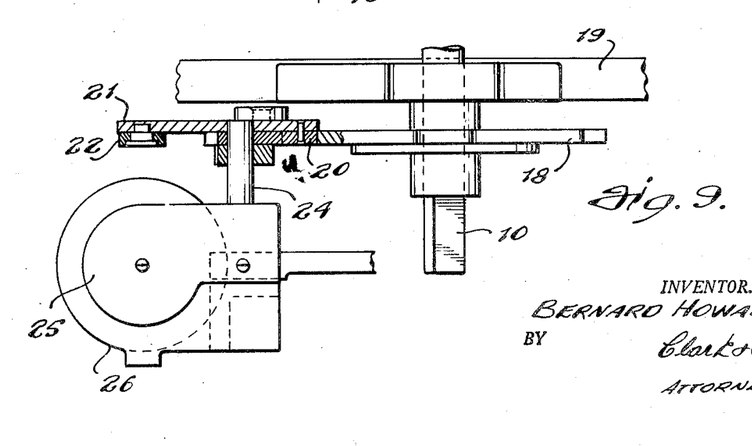
Fig. 9 is a fragmentary sectional view taken approximately on line 9—9 of Fig. 4.
Figures 12, 13, 14, 15:
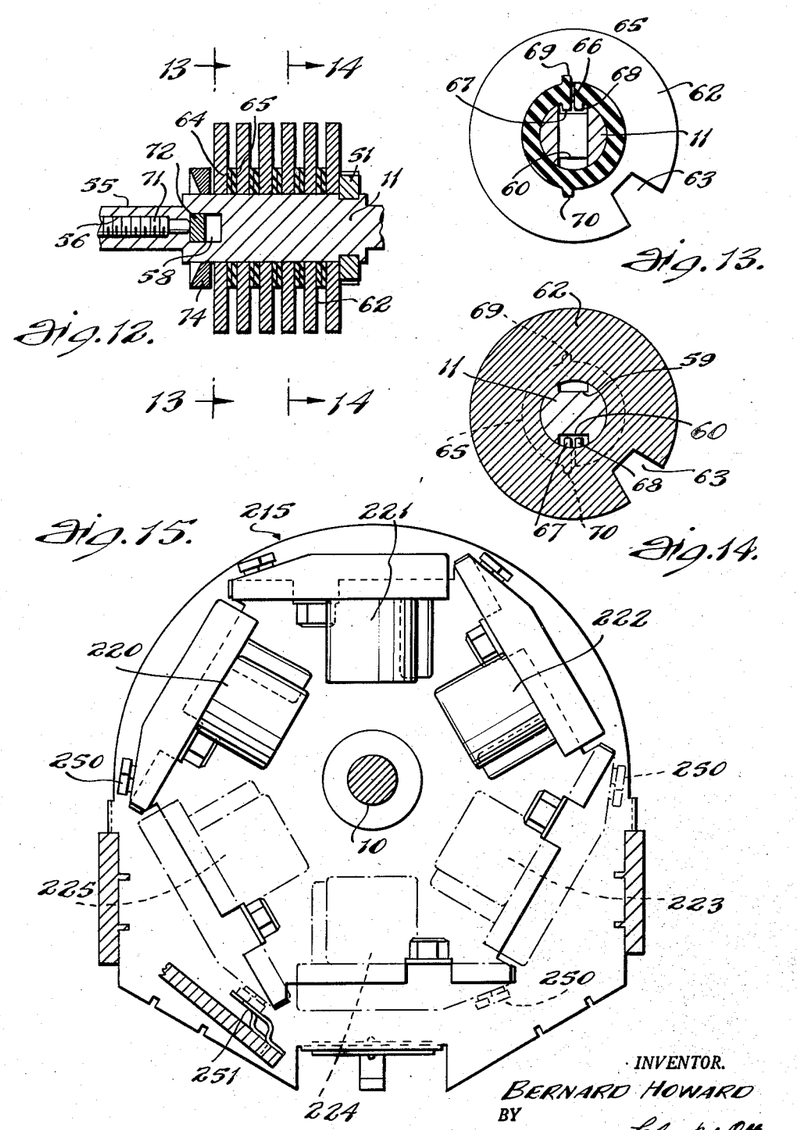
Fig. 12 is a longitudinal sectional view through a fragmentary portion of the condenser shaft taken approximately on line 12—12 of Fig. 5 and showing the detent and spacer disks mounted thereon and shown in section.
Fig. 13 is a sectional view through one of the spacer disks taken approximately on line 13—13 of Fig. 12.
Fig. 14 is a sectional view through one of the detent disks taken approximately on line 14—14 of Fig. 12.
Fig. 15 is a vertical sectional view through the turret shaft taken approximately on line 15—15 of Fig. 2 and showing the six sectors of one of the sections with the tuning parts mounted thereon.
Figures 16, 17, 18:
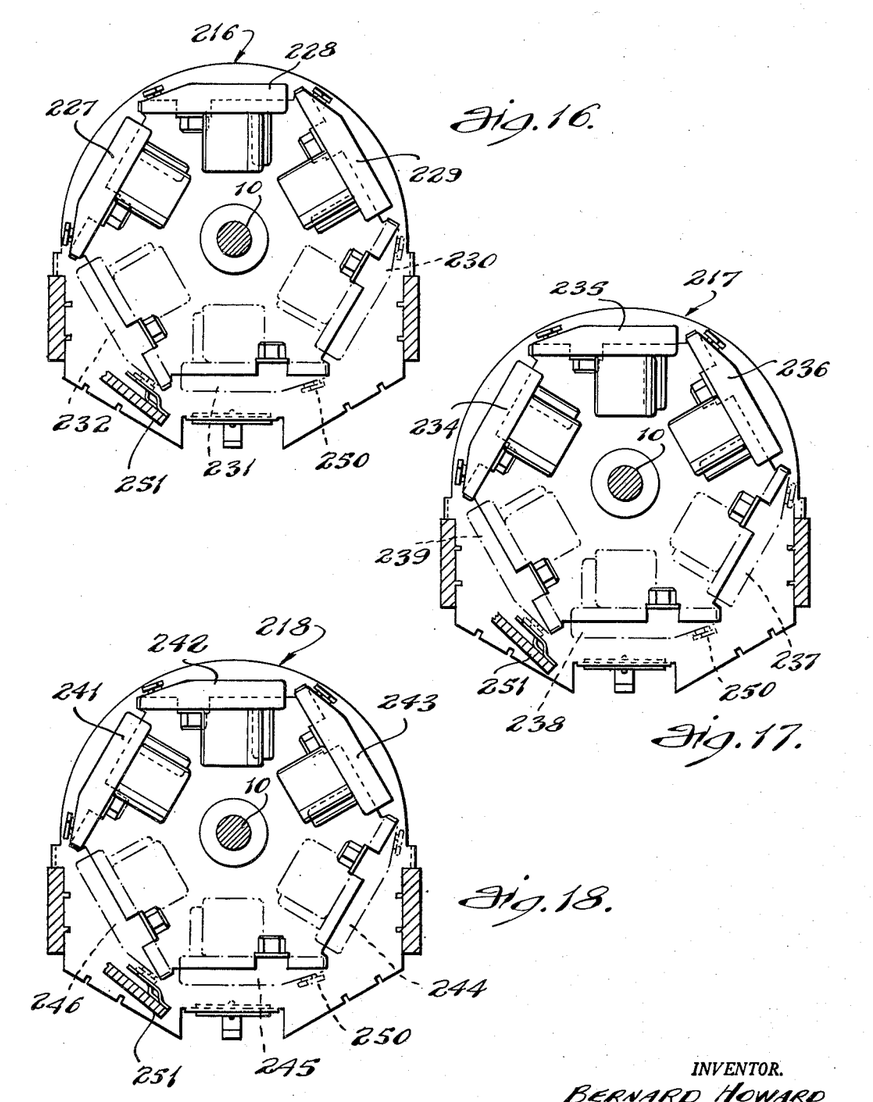
Figs. 16, 17 and 18 are views similar to Fig. 15 taken approximately on lines 16—16, 17—17 and 18—18 respectively of Fig. 2.
Figure 19:
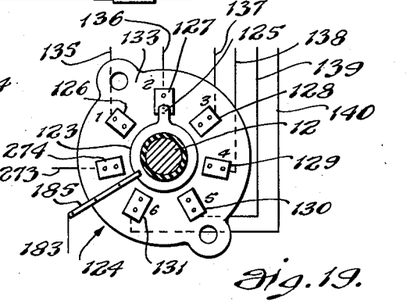
Fig. 19 is a face view of the preselector switch mounted on the manual control shaft.
Figure 20:
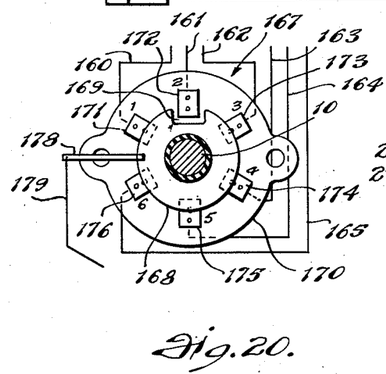
Fig. 20 is a face view of the seeking switch mounted on the turret shaft.
Figure 21:
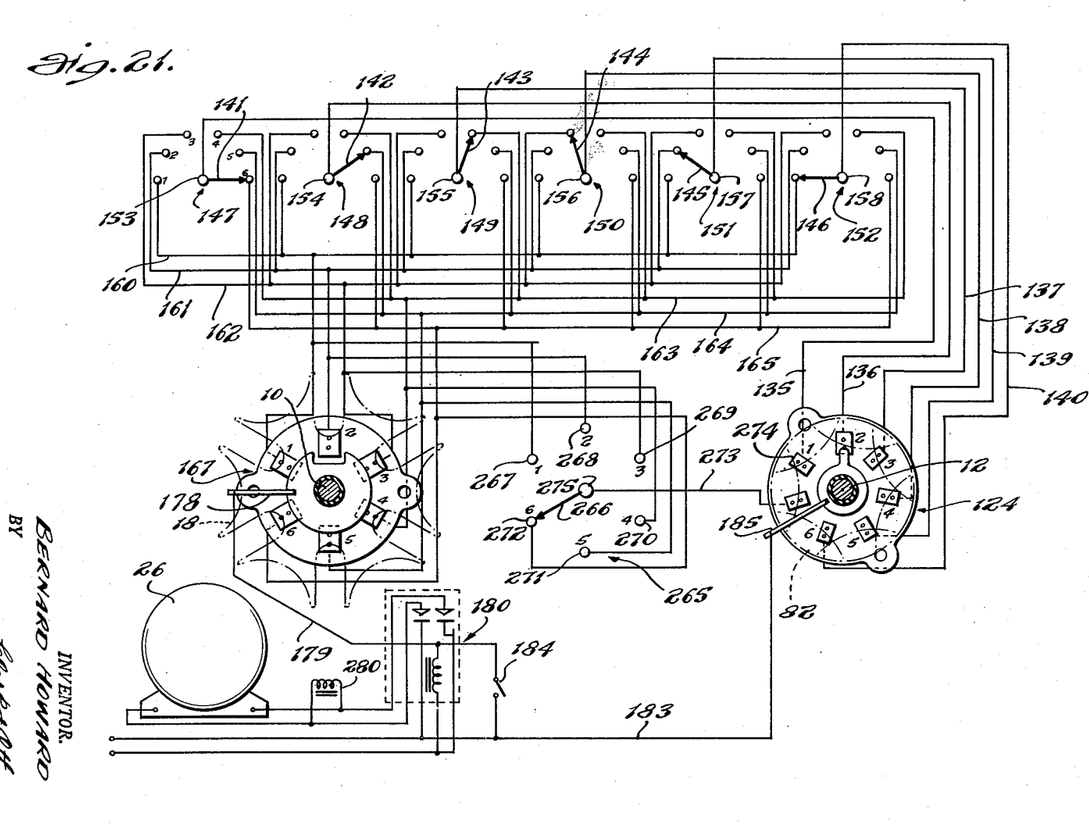
Fig. 21 is a schematic view of the electrical wiring showing the several switches and the connection with the motor.

When any one of the arcuate projections 88 of the pawls 84 is moved out of a slot 89 in the drum 82 by the manual setting of the drum, the terminal 87 is exerted against the projection 101 of the latch bar 42 so as to swing said bar on the shaft 100 to the right of the position shown in Fig. 4 of the drawings, whereupon the latch bar is swung to the right so that the dog engages against the edge of the rack and will engage in the recess 44 therein when the slide 36 is moved along the rack.

With the swinging of the latch bar 42 to the right, the shaft 100 will be rotated so as to turn the latch arm 106 to move the pin 111 downwardly beyond the longitudinal center line of the toggle lever 107 which functions to retain the latch bar to the right and the slide against the edge of the rack. With the setting of the manual control shaft 12, the shaft 24 will be rotated by the motor in a counterclockwise direction which functions to move the slide relative to the rack so that the dog will engage in the slot therein by the tension of the coil spring 105. The rack is thereupon moved so as to rotate the condenser shaft whereupon one of the detents will be available to receive the rounded projection 86 of the pawl selected by the manual setting of the control shaft 12 which will engage in said detent by the pressure of the leaf spring 91. By this movement of the pawl the terminal 87 swings the latch bar 42 by engagement of said terminal against the laterally extending projection 101 thereof which functions to rotate the shaft 100 whereupon the spring 112 snaps the latch arm 106 to a position on the opposite side of the longitudinal center line of the toggle lever 107 into the position shown in Fig. 4 of the drawings. This movement of the latch arm to the position shown in Fig. 4 causes the right hand edge of the projection 101 to strike against the terminal 87 to thereby firmly seat the same in the detent of the detent disk as hereinbefore described which accurately locates the condenser shaft.

The manual control shaft 12 is journaled in bearings 115 and 116 in the front wall 15 and the auxiliary forward wall 19 respectively and is geared by gears 117 and 118 to a short shaft 119 journaled in a bearing 120 in the forward wall 19. The forward end of said shaft 119 protrudes through the front panel 30 and is provided with a knob 121 for manually setting the drum 82 to any one of said preselect positions. Mounted on the protruding end of the manual control shaft 12 is a contact ring 123 of a preset-selector switch 124 which ring is insulated from the shaft 12 and is provided with a contact wiper 125 adapted to engage any one of a plurality of fixed contacts 126 to 131 arranged in arcuately spaced relation on an insulation disk 133 affixed to the auxiliary forward wall 18. The location of the contacts 126 to 131 corresponds to the arcuate arrangement of the slots 89 of the drum 82 so that when the projection 87 of any one of the pawls 84 engages in one of the slots 89 of the drum, the contact wiper 125 will engage the corresponding contact.

The fixed contacts 126 to 131 are connected by conductor wires 135 to 140 to movable contact arms 141 to 146 respectively of preset-setup switches 147 to 152. The switches 147 to 152 are mounted in the front panel 30 with the contact arms 141 to 146 affixed to rotating shafts 153 to 158 protruding therethrough and having kerfed outer ends adapted to be engaged by a suitable tool for manually setting the contact arms. The said switches are each provided with a plurality of fixed contacts which are six in number in the embodiment illustrated corresponding to the number of turret positions and the number of detent disks 62. Corresponding contacts of each of said switches are respectively connected with bus lines 160 to 165 which are connected to a seeking switch 167 at arcuately spaced points.

The seeking switch 167 consists of a contact ring 168 mounted on the outer end of the turret shaft 10 and which is insulated therefrom and formed with a notch 169 in the periphery thereof. Secured to the auxiliary forward wall 19 is an insulation disk 170 having a plurality of wiper contacts 171 to 176 respectively which are respectively connected with the bus lines 160 to 165. The said wiper contacts 171 to 176 project radially inward into normal overlying contact with the contact ring 168 until the wiper contacts engage the notch 169 when the contact is broken. The contact ring 168 is in contact at all times with a wiper contact 178 affixed to the insulation disk 170 and which is connected by a conductor wire 179 to a relay 180 for controlling the motor 26.

In order to complete the circuit with the preset-selector switch 124, a conductor wire 183 is connected to the conductor wire 179 and leads through a starting switch 184 and to a wiper contact 185 of said switch. The said wiper contact is affixed to the insulation disk 133 and extends into contact with the contact ring 123. The starting switch 184 is a normally closed switch and the same is adapted to be released by the swinging bar 38 for closing the circuit with the motor 26 when the swinging bar is moved toward the rack 45 by the manual setting of the drum 82. The said starting switch is mounted on the rear of the auxiliary forward wall 19 and consists of a fixed contact 187 and a movable contact 188 adapted to be engaged by an insulated finger 189 affixed to the lower end of the swinging bar 38. It is to be understood that with the movement of the terminal 87 of one of the pawls 84 into a detent 63 to discontinue the rotation of one of the detent disks 62, the swinging bar 38 will be swung to the left out of engagement with the rack 45 as shown in Fig. 4 of the drawings to thereby move the contact 188 out of engagement with the contact 187 to break the circuit with the motor and when the drum 82 is manually set one of the pawls 84 will be moved out of engagement with one of the slots 89 whereby the swinging bar 38 will be swung to the right of the position shown in Fig. 4 of the drawings to thereby release the movable contact 188 so that the same engages the contact 187 to close the circuit with the motor for starting the same.

The swinging bar 38 has limited swinging movement by means of a U-shaped stop member 195 secured to the front face of the front wall 15 and which stop member has a guide bar 196 affixed thereto with a longitudinally extending slot 197 in the upper edge thereof in which the lower end of the swinging bar 38 slidably engages for movement between stop elements 198 and 199 located at the opposite ends of the stop member 195.

Figure 1:
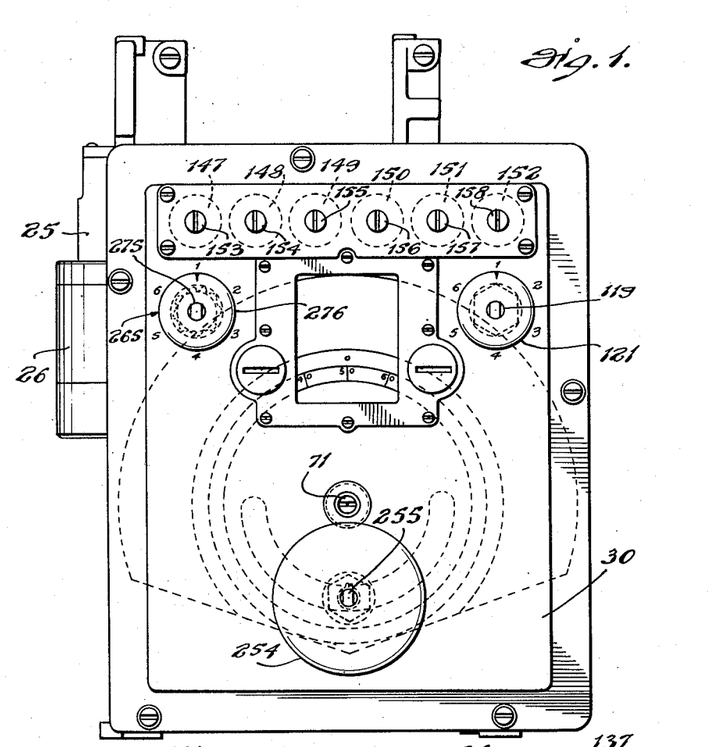
Fig. 1 is a view in front elevation of a preselector mechanism constructed in accordance with the invention.
Figure 2:
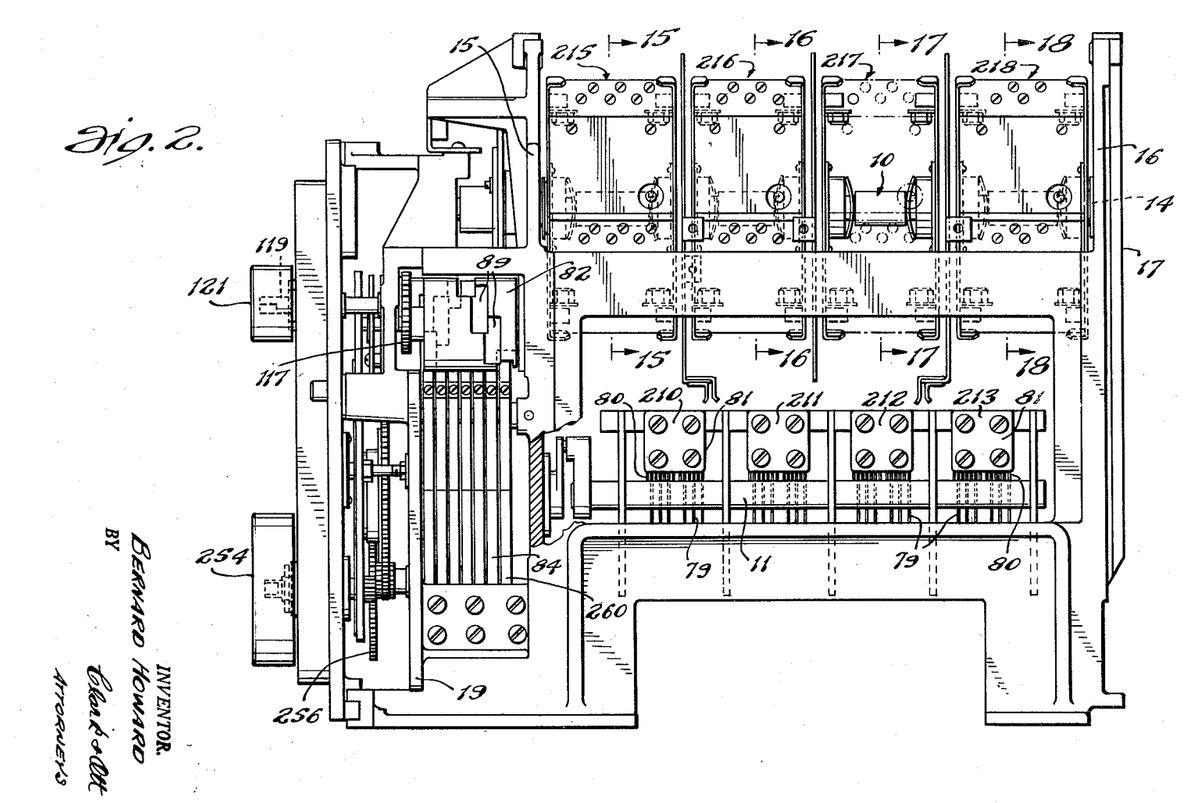
Fig. 2 is a side view thereof.
Figures 3, 10:
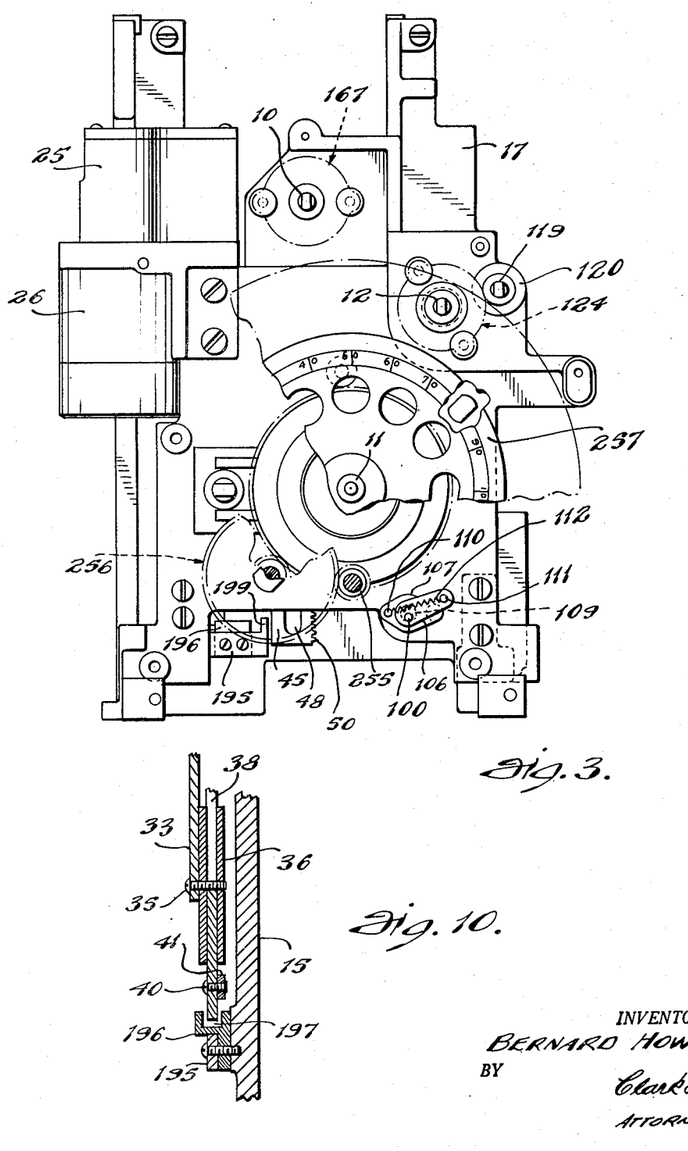
Fig. 3 is a fragmentary front view with the front panel removed to show the underlying portions.
Fig. 10 is a fragmentary sectional view taken approximately on line 10—10 of Fig. 4.

The condensers 81 consist of four condensers or sections 210, 211, 212 and 213 as indicated in Fig. 2 of the drawings which are tunable capacitors of a radio receiver, radio transmitter or the like. One of the condensers or sections such as the condenser or section 210 may be a tunable capacitor in the oscillator circuit of a radio receiver, while the condensers or sections 211 and 212 may be tunable capacitors in the radio frequency amplifier circuit, and the condenser or section 213 may be a tunable capacitor in the antenna circuit. The turret shaft 10 is also provided with four tuning sections indicated by the reference characters 215, 216, 217 and 218 each having six sectors arranged in circumferentially spaced relation around the sections respectively as indicated in Fig. 2 of the drawings. These sectors provide mountings on which are arranged inductance coils and other parts of a radio receiver, radio transmitter or the like and which provide six different frequency ranges. The inductance coils and parts mounted on the sectors of the tuning section 215 are respectively indicated by the reference characters 220 to 225, the inductance coils and parts on the sectors of the tuning section 216 are respectively represented by the reference characters 227 to 232, the inductance coils and parts on the sectors of the tuning section 217 are respectively represented by the reference characters 234 to 239 and the inductance coils and parts on the sectors of the tuning section 218 are respectively represented by the reference characters 241 to 246. The six different frequency ranges may vary as desired, for instance, the inductance coils and parts indicated by the reference characters 220, 227, 234 and 241 may be arranged to provide for a frequency range of 500 to 1,000 kilocycles, the inductance coils and parts represented by the reference characters 221, 228, 235 and 242 may be arranged to provide for a frequency range of 1,000 to 2,000 kilocycles, and the inductance coils and parts indicated by the reference characters 225, 232, 239, and 246 may be arranged to provide for a frequency range of 16,000 to 32,000 kilocycles with the intermediate inductance coils and parts providing proportionate frequency ranges. The sectors each have a contact 250 which is adapted to engage a fixed contact 251 arranged on the casing 252 by the movement of the turret shaft to the six positions provided by the Geneva wheel 18. When in these positions respectively, the inductance coils and parts 220 to 225 of the section 215 are in the oscillatory circuit of the radio receiver, the inductance coils and parts 227 to 232 and 234 to 239 of the sections 216 and 217 are in the radio frequency amplifier circuit thereof and the inductance coils and parts 241 to 246 of the section 218 are in the antenna circuit.

The six fixed contacts 126 to 131 inclusive of the preset-setup switches 147 to 152 are respectively connected by means of the bus lines 160 to 165 through the seeking switch 167 to the motor when the preselector mechanism is in operation to thereby position the turret shaft 10 in any one of the six positions represented by the angular position of the six sectors and when so positioned, the frequency range of the sectors brought into position will be interposed in the aforesaid circuits of the radio receiver.

With the use of the preselector mechanism for presetting a radio receiver to a frequency of 600 kilocycles, the contact arm 141 of the preset-setup switch 147 is set to engage the fixed contact thereof connected with the bus line 160 by manually turning the shaft on which the contact arm is mounted by means of a suitable tool adapted to engage the kerfed outer end thereof. The manual control shaft 12 is then manually set to a position so that the circuit to the contact arm 141 is closed through the contact 126. With the setting of the manual control shaft 12, the projection 88 of one of the pawls 84 will be moved out of one of the slots 89 in the drum 82 whereby the swinging bar 38 will be swung to the right to thereby release the movable contact so that the same engages the contact to close the circuit with the motor for starting the same. The preselector mechanism is then operated to turn the turret shaft to the position to place the inductance coils and parts 220, 227, 234 and 241 of the sections in the oscillator, frequency amplifier and antenna circuits. The condenser shaft is rotated with the movement of the turret shaft through the Geneva movement and the pitman and rack mechanism until the projection 86 of one of the pawls 84 engages in a notch or detent 63 of one of the disks 62 on said condenser shaft. This breaks the circuit with the motor so as to discontinue further rotation of the turret and condenser shafts. The condenser and turret shafts are thus positioned so that the radio receiver is tuned to a frequency range of 500 to 1,000 kilocycles. The pressure screw 71 on the condenser shaft is then loosened to permit of relative slippage of the disks thereon. The condenser shaft is then rotated by manipulating a control knob 254 located on the outer end of an auxiliary shaft 255 geared to the condenser shaft by gearing 256 to thereby adjust the condensers thereon to a frequency of 600 kilocycles as shown on the dial 257 located adjacent the knob. If desired, the same may be checked by means of an external signal generator set at 600 kilocycles. The pressure screw 71 is then tightened to set the condenser shaft in the set position for the frequency of 600 kilocycles.

In the event that a frequency of 17,500 kilocycles is desired while retaining the 600 kilocycle setting, the contact arm 146 of the preset-setup switch 152 is set to engage the fixed contact thereof connected with the bus line 165. The manual control shaft 12 is then manually set to a position so that the circuit to the contact arm 146 of the preset-setup switch 152 is closed through the fixed contact 131 of the preset-selector switch 124. The motor will be started by the setting of the manual control shaft 12 as hereinbefore explained and the preselector mechanism will be operated to turn the turret shaft to a position to place the inductance coils and parts 225, 232, 239 and 246 of the sections in the oscillator, frequency amplifier and antenna circuits. The condenser shaft is rotated with the movement of the turret shaft until the projection 86 of the aforesaid pawl engages in the notch or detent 63 of one of the disks 62 on the condenser shaft. This breaks the circuit with the motor so as to discontinue further rotation of the turret and condenser shafts which are positioned to tune the radio receiver to a frequency range of 16,000 to 32,000 kilocycles. The pressure screw 71 on the condenser shaft is then loosened as before and the shaft rotated by manipulating the knob 254 to thereby position the condensers thereon to obtain a frequency of 17,500 kilocycles as shown on the dial 257. The pressure screw 71 is then tightened to set the condenser shaft in the adjusted position for the frequency of 17,500 kilocycles. This tunes the radio receiver to the particular setting of 17,500 kilocycles. If the radio receiver is to operate again on the 600 kilocycle setting, the manual control shaft 12 may be reset to the position for said setting. It is thus possible to preset any one of the six preset-setup switches to provide a particular frequency setting in any one of the six frequency ranges. It is also possible to preset the preselector mechanism so as to provide for six different frequencies in any one of the ranges.

The preset-selector mechanism is also adapted to be set for the manual tuning of the radio receiver to any desired frequency within any of the frequency ranges. For this purpose an additional pawl 260 is provided on the shaft 85 which pawl has an arcuate projection 261 and the drum 82 of the manual control shaft 12 is provided with an additional slot 89 for receiving the projection 261 of the pawl 260. The pawl 260 is also provided with a terminal 262 adapted to engage the angulated bar 41 for swinging the swinging bar 38 to thereby disengage the slide 36 from the rack 45 so as to permit of independent manual operation of the condenser shaft 11.

A preset-selector switch 265 is provided which has a contact arm 266 and six fixed contacts 267 to 272 and which is connected with the preset-selector switch 124 by a conductor wire 273 leading from a fixed contact 274 thereof to a rotating shaft 275 to which the contact arm 266 is affixed. The preset-selector switch 265 is mounted on the front panel 30 and a hand knob 276 is affixed to the shaft 275 for manually setting the contact arm on any one of the fixed contacts 267 to 272. The said fixed contacts are respectively connected with the bus lines 160 to 165. When the manual control shaft 12 is adjusted to dispose the contact wiper 125 of the preset-selector switch 124 in engagement with the contact 274, the projection 261 of the pawl 260 will engage in the slot 89 provided on the drum 82 which will effect movement of the swinging bar 38 to permit of independent manual operation of the condenser shaft 11 for setting the condensers thereon.

When the motor 26 is energized by the closing of the starting switch 184 to put the device into operation, a solenoid 280 connected across the circuit to the motor is energized to move a clutch arm 281 rearwardly to thereby dispose the clutch 282 slidably mounted on the shaft portion 55 out of engagement with the hub of the dial 257, whereby the dial 257, the shaft 255 and control knob 254 do not rotate with the operation of the device. When, however, the circuit with the motor 26 is interrupted to discontinue operation of the device, a spring 283 moves the clutch 282 into engagement with the hub of the dial 257 whereby the condenser shaft 11 is operatively connected with the control knob 254 so that the dial 257 may be rotated and the condensers on the shaft 11 adjusted to the frequency desired as hereinbefore set forth.

What is claimed is:

1. In a preselector frequency tuning mechanism, a frame, a tuning shaft mounted for rotation on said frame and having carrier wave tuning means, a drive shaft mounted on said frame, cooperating means including a toothed disk and a Geneva wheel mounted on said drive and tuning shafts for turning said tuning shaft in step by step rotation to position the same for connecting said tuning means in oscillator, radio frequency and antenna circuits, a tuning shaft mounted on said frame and having a plurality of tunable capacitors connected in the oscillator, radio frequency and antenna circuits, and cooperating means providing reciprocatory turning movement to said last mentioned tuning shaft with the rotation of the drive shaft, said last mentioned cooperating means including a rack engaging said last mentioned tuning shaft, a bar pivotally connected to said frame and having a reciprocatory slide adapted to operatively engage said rack for moving the same with the movement of the slide and a link pivoted to said toothed disk and to said slide for moving said slide with the rotation of said drive shaft to thereby impart reciprocatory turning movement to the last mentioned tuning shaft.

2. In a preselector frequency tuning mechanism, a frame, a tuning shaft mounted for rotation on said frame and having a plurality of arcuately spaced sets of carrier wave tuning means providing a plurality of frequency ranges, a drive shaft mounted on said frame, cooperating means including a toothed disk and a Geneva wheel mounted on said shafts for turning said tuning shaft in step by step rotation to positions for connecting said sets respectively in oscillator, radio frequency and antenna circuits, a tuning shaft mounted on said frame and having a plurality of tunable capacitors connected in the oscillator, radio frequency and antenna circuits, and cooperating means providing reciprocatory turning movement to said last mentioned tuning shaft with the rotation of the drive shaft, said last mentioned cooperating means including a rack engaging said last mentioned tuning shaft, a bar pivotally connected to said frame and having a reciprocatory slide adapted to operatively engage said rack for moving the same with the movement of the slide and a link pivoted to said toothed disk and to said slide for moving said slide with the rotation of said drive shaft to thereby impart reciprocatory turning movement to the last mentioned tuning shaft.

3. In a preselector frequency tuning mechanism, a frame, a tuning shaft mounted for rotation on said frame and having a plurality of arcuately spaced sets of carrier wave tuning means providing a plurality of frequency ranges, a drive shaft mounted on said frame, cooperating means including a toothed disk and a Geneva wheel mounted on said shafts for turning said tuning shaft in step by step rotation to positions for connecting said sets respectively in oscillator, radio frequency and antenna circuits, a tuning shaft mounted on said frame and having a plurality of tunable capacitors connected in the oscillator, radio frequency and antenna circuits, cooperating means providing reciprocatory turning movement to said last mentioned tuning shaft with the rotation of the drive shaft, said last mentioned cooperating means including a rack engaging said last mentioned tuning shaft, a bar pivotally connected to said frame and having a reciprocatory slide adapted to operatively engage said rack for moving the same with the movement of the slide and a link pivoted to said toothed disk and to said slide for moving said slide with the rotation of said drive shaft to thereby impart reciprocatory turning movement to the last mentioned tuning shaft, disks corresponding in number to the number of said sets of carrier wave tuning means mounted on said last mentioned tuning shaft in longitudinally spaced relation for turning therewith and having detents in the peripheries thereof respectively, a manually controlled member rotatably mounted on said frame in parallel relation with said last mentioned tuning shaft and having detents in the periphery thereof corresponding in number to the number of said disks, pawls pivotally mounted on said frame and corresponding in number to the number of said disks and each disposed in alignment with one of the disks and with one of the detents in said manually controlled member, said pawls having projections adapted to simultaneously engage in the detents respectively in the disks and manually controlled member to stop the turning of the last mentioned tuning shaft, an electric motor operatively connected with said drive shaft for turning the same, a starting switch in circuit with said motor, means carried by said link adapted to be engaged by said pawls respectively for closing the switch to start said motor with the setting of the manual control shaft for engagement by any one of said pawls, and means carried by said link adapted to be engaged by the pawls respectively for moving said slide out of engagement with the rack when any one of said pawls engages in the detent of one of the disks.

4. In a preselector frequency tuning mechanism, a tuning shaft mounted for rotation on said frame and having a plurality of arcuately spaced sets of carrier wave tuning means providing a plurality of frequency ranges, a drive shaft mounted on said frame, cooperating means connected with said drive and tuning shafts for turning said tuning shaft in step by step rotation to positions for connecting said sets respectively in oscillator, radio frequency and antenna circuits, a tuning shaft mounted on said frame and having a plurality of tunable capacitors connected in the oscillator, radio frequency and antenna circuits, cooperating means connected with said last mentioned tuning shaft and with the first mentioned cooperating means for imparting reciprocatory turning movement to the last mentioned tuning shaft with the rotation of the drive shaft, disks corresponding in number to the number of said sets of tuning means mounted on said last mentioned tuning shaft in longitudinally spaced relation for turning therewith and having detents in the peripheries thereof respectively, a manually controlled member rotatably mounted on said frame in parallel relation with said last mentioned tuning shaft and having detents in the periphery thereof corresponding in number to the number of said disks, pawls pivotally mounted on said frame and corresponding in number to the number of said disks and each disposed in alignment with one of the disks and with one of the detents in said manually controlled member, said pawls having projections adapted to simultaneously engage in the detents respectively in the disks and manually controlled member to stop the turning of the last mentioned tuning shaft, an electric motor operatively connected with said drive shaft for turning the same, a starting switch in circuit with said motor, means carried by said second mentioned cooperating means adapted to be engaged by said pawls respectively for closing the switch to start said motor with the setting of the manually controlled member for engagement by any one of said pawls, and means carried by said second mentioned cooperating means adapted to be engaged by the pawls respectively for disengaging said cooperating means when any one of the pawls engages the disks to stop the turning of said second mentioned tuning shaft.

5. In a preselector frequency tuning mechanism, a frame, a tuning shaft mounted for rotation on said frame and having a plurality of arcuately spaced sets of carrier wave tuning means providing a plurality of frequency ranges, a drive shaft mounted on said frame, cooperating means including a toothed disk and a Geneva wheel mounted on said shafts for turning said tuning shaft in step by step rotation to positions for connecting said sets respectively in oscillator, radio frequency and antenna circuits, a tuning shaft mounted on said frame and having a plurality of tunable capacitors connected in the oscillator, radio frequency and antenna circuits, cooperating means providing reciprocatory turning movement to said last mentioned tuning shaft with the rotation of the drive shaft, said last mentioned cooperating means including a rack engaging said last mentioned tuning shaft, a bar pivotally connected to said frame and having a reciprocatory slide adapted to operatively engage said rack for moving the same with the movement of the slide and a link pivoted to said toothed disk and to said slide for moving said slide with the rotation of said drive shaft to thereby impart reciprocatory turning movement to the last mentioned tuning shaft, disks corresponding in number to the number of said sets of carrier wave tuning means mounted on said last mentioned tuning shaft in longitudinally spaced relation for turning therewith and having detents in the peripheries thereof respectively, a manually controlled member rotatably mounted on said frame in parallel relation with said last mentioned tuning shaft and having detents in the periphery thereof corresponding in number to the number of said disks, pawls pivotally mounted on said frame and corresponding in number to the number of said disks and each disposed in alignment with one of the disks and with one of the detents in said manually controlled member, said pawls having projections adapted to simultaneously engage in the detents respectively in the disks and manually controlled member to stop the turning of the last mentioned tuning shaft, an electric motor operatively connected with said drive shaft for turning the same, a starting switch in circuit with said motor, means carried by said link adapted to be engaged by said pawls respectively for closing the switch to start said motor with the setting of the manually controlled member for engagement by any one of said pawls, means carried by said link adapted to be engaged by the pawls respectively for moving said slide out of engagement with the rack when any one of said pawls engages in the detent of one of the disks, a switch having a plurality of fixed contacts corresponding in number to the number of said sets and having a contact arm movable with said manually controlled member to selectively engage the fixed contacts thereof when the same is set for engagement by the pawls respectively and said contact arm being in circuit with said starting switch, a switch having fixed contacts corresponding in number to the number of said sets and having a contact member in circuit with said motor and movable with said first named tuning shaft to continuously engage all but one of the fixed contacts thereof, a plurality of preset switches corresponding in number to the number of detents in said manually controlled member and each having a plurality of fixed contacts corresponding in number to the number of said sets with the fixed contacts of the several preset switches electrically connected with the fixed contacts respectively of said last mentioned switch, and each of said preset switches having a movable contact arm adapted to be manually set for engaging any one of the fixed contacts thereof and said contact arms of the preset switches being electrically connected with the fixed contacts respectively of said second mentioned switch whereby any one of the contact arms of said preset switches may be manually preset on the fixed contacts thereof for obtaining said frequency ranges respectively with the manual setting of the manually controlled member for engagement in one of the detents thereof by the pawls and to electrically connect the contact thereof with the contact arm of the preset switch which has been preset to thereby effect starting of the motor and the turning of said tuning shafts and to effect by the operation of the mechanism the stopping of the motor when the frequency range has been obtained.

6. In a preselector frequency tuning mechanism, a tuning shaft mounted for rotation on said frame and having a plurality of arcuately spaced sets of carrier wave tuning means providing a plurality of frequency ranges, a drive shaft mounted on said frame, cooperating means connected with said drive and tuning shafts for turning said tuning shaft in step by step rotation to positions for connecting said sets respectively in oscillator, radio frequency and antenna circuits, a tuning shaft mounted on said frame and having a plurality of tunable capacitors connected in the oscillator, radio frequency and antenna circuits, cooperating means connected with said last mentioned tuning shaft and with the first mentioned cooperating means for imparting reciprocatory turning movement to the last mentioned tuning shaft with the rotation of the drive shaft, disks corresponding in number to the number of said sets of tuning means mounted on said last mentioned tuning shaft in longitudinally spaced relation for turning therewith and having detents in the peripheries thereof respectively, a manually controlled member rotatably mounted on said frame in parallel relation with said last mentioned tuning shaft and having detents in the periphery thereof corresponding in number to the number of said disks, pawls pivotally mounted on said frame and corresponding in number to the number of said disks and each disposed in alignment with one of the disks and with one of the detents in said manually controlled member, said pawls having projections adapted to simultaneously engage in the detents respectively in the disks and manually controlled member to stop the turning of the last mentioned tuning shaft, an electric motor operatively connected with said drive shaft for turning the same, a starting switch in circuit with said motor, means carried by said second mentioned cooperating means adapted to be engaged by said pawls respectively for closing the switch to start said motor with the setting of the manually controlled member for engagement by any one of said pawls, means carried by said second mentioned cooperating means adapted to be engaged by the pawls respectively for disengaging said cooperating means when any one of the pawls engages the disks to stop the turning of said second mentioned tuning shaft, a switch having a plurality of fixed contacts corresponding in number to the number of said sets and having a contact arm movable with said manually controlled member to selectively engage the fixed contacts thereof when the same is set for engagement by the pawls respectively and said contact arm being in circuit with said starting switch, a switch having fixed contacts corresponding in number to the number of said sets and having a contact member in circuit with said motor and movable with said first named tuning shaft to continuously engage all but one of the fixed contacts thereof, a plurality of preset switches corresponding in number to the number of detents in said manually controlled member and each having a plurality of fixed contacts corresponding in number to the number of said sets with the fixed contacts of the several preset switches electrically connected with the fixed contacts respectively of said last mentioned switch, and each of said preset switches having a movable contact arm adapted to be manually set for engaging any one of the fixed contacts thereof and said contact arms of the preset switches being electrically connected with the fixed contacts respectively of said second mentioned switch whereby any one of the contact arms of said preset switches may be manually preset on the fixed contacts thereof for obtaining said frequency ranges respectively with the manual setting of the manually controlled member for engagement in one of the detents thereof by the pawls and to electrically connect the contact thereof with the contact arm of the preset switch which has been preset to thereby effect starting of the motor and the turning of said tuning shafts and to effect by the operation of the mechanism the stopping of the motor when the frequency range has been obtained.

BERNARD HOWARD.

No reference cited.